United States Patent
Kocalar et al.

(10) Patent No.: US 7,313,096 B2
(45) Date of Patent: Dec. 25, 2007

(54) MULTIPLEXING A COMMUNICATION PORT

(75) Inventors: Erturk D. Kocalar, Sunnyvale, CA (US); John Henry Grossman, IV, Fremont, CA (US); Michael G. Fuller, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1103 days.

(21) Appl. No.: 10/150,975

(22) Filed: May 20, 2002

(65) Prior Publication Data

US 2003/0214981 A1    Nov. 20, 2003

(51) Int. Cl.
*H04J 1/16*   (2006.01)
*H04J 3/14*   (2006.01)
*H04J 3/02*   (2006.01)
*H04L 1/00*   (2006.01)
*H04L 12/26*  (2006.01)

(52) U.S. Cl. .................................... 370/241; 370/537
(58) Field of Classification Search .................. None
See application file for complete search history.

(56) References Cited

U.S. PATENT DOCUMENTS

| | | | | |
|---|---|---|---|---|
| 5,644,705 | A | | 7/1997 | Stanley ................ 395/183.18 |
| 5,838,692 | A | * | 11/1998 | Tobin ......................... 714/724 |
| 5,948,092 | A | | 9/1999 | Crump et al. ............... 710/129 |
| 6,065,073 | A | * | 5/2000 | Booth .......................... 710/46 |
| 6,209,042 | B1 | | 3/2001 | Yanagisawa et al. ........... 710/3 |
| 6,253,268 | B1 | * | 6/2001 | Bjorkengren et al. ....... 710/105 |
| 6,700,898 | B1 | * | 3/2004 | Barakat et al. ............. 370/442 |
| 7,007,109 | B2 | * | 2/2006 | Sivertsen ...................... 710/15 |

OTHER PUBLICATIONS

Dokoupil, Z.; Personal Computer Debug Port; *Journal of Electrical Engineering;* vol. 50, No. 3-4, 1999; pp. 102-105.

Gonzales, D.R. and Branson, B.; Real-Time Debugging and Wireless Devices; *Dr. Dobb's Journal;* vol. 26, No. 3; Mar. 2001; pp. 92-101.

Information Technology—AT Attachment with Packet Interface—7, vol. 2 (ATA/ATAPI-7 V2); T13 1532D vol. 2; Feb. 27, 2002; 252 pgs.

Hebert, J.; International Debuggers Simplify Mu P PC-Board Verification; *EDN;* vol. 39, No. 10; May 12, 1994; pp. 103-104, 106.

Tanno, K. and Takeda, T.; Multiplexing of Communication Ports on Unix Terminals for Packet Radio Networks; *1st International Conference on Universal Personal Communications, ICUPC '92 Proceedings,* New York, 1992; pp. 15.04/1-4.

* cited by examiner

*Primary Examiner*—Daniel J. Ryman
(74) *Attorney, Agent, or Firm*—Workman Nydegger

(57) ABSTRACT

Methods, systems, and computer program products for multiplexing a target communication port to provide an additional independent communication channel sharing at least some portion of hardware associated with the target port. Typically, a device, such as a disk drive, is also connected to the target port. An out-of-band signal indicates when the shared hardware is being used to provide the additional independent communication channel to avoid interfering with the target port device. A communication board with one or more communication ports may be coupled to the additional independent communication channel for communicating data from the target system to other devices or systems, such as a host system, through the communication board. In communicating with the target system, the communication board may emulate a particular interface that is supported by the target port. One type of host system may be a development system for designing, testing and debugging the target system.

32 Claims, 7 Drawing Sheets

MULTIPLEXING A COMMUNICATION PORT

CROSS-REFERENCE TO RELATED APPLICATIONS

N/A

BACKGROUND OF THE INVENTION

1. The Field of the Invention

The present invention relates to communication ports. More specifically, the present invention relates methods, systems, and computer program products for multiplexing a communication port to provide an additional independent communication channel.

2. Background and Related Art

Developing hardware and software for embedded system presents a variety of challenges. One challenge in particular relates to differences that frequently are encountered between the development environment and the runtime environment. As a general rule, development environments include a rich set of design tools, such as editors, compilers, debuggers, simulators, etc., to facilitate the development process, whereas runtime environments for embedded systems tend to be optimized for a particular specialized task. Often cost and efficiency drive the level of optimization of a runtime environment for an embedded system.

For example, consider the development of software and hardware for a cellular telephone. While the cellular telephone may include a display and a keyboard, it is far from an ideal development environment. To improve the cellular telephone as a development platform, a video card could be added for a larger display, a mouse port and a port for a full size keyboard could be added to simplify user input, the memory and internal processor could be enhanced to support a compiler, a debugger, and other development tools, and so forth. Of course, improving the cellular telephone as a development platform makes little sense because the increased size, performance, and cost will be wasted when the device is used as intended, and therefore will be of little or no benefit, and more likely a detriment, to the consumer who ultimate purchases a cellular telephone. Now, this is not to say the cellular telephone may not benefit from a larger display, additional input options, more memory, and increased processor performance. On the contrary, as cellular telephones become more general purpose computing devices, any and all of these enhancements are likely to occur. The point is that enhancements focusing on end use-on how the device is intended to operate day after day-provide more value to consumers than enhancements focusing on the development process.

Accordingly, it is usually desirable to minimize components that tend to serve only a development purpose and to maximize components that tend to provide a benefit for end use. For embedded systems in particular, however, development specific components are necessary. Since the runtime environment of an embedded system typically lacks sufficient development tools, the embedded system may communicate certain data to a more robust development environment for debugging and testing. The question then becomes how to communicate between the runtime environment and the development environment.

One approach is to provide a communication port that may be used for debugging within the embedded system. This communication port may be used by software engineers to develop and debug software related to the system, by hardware engineers to test specific parts of the system, and by the manufacturing team to test and debug the final product. The port also may be used when an end user returns a faulty product and the manufacturer needs to determine what went wrong. The system being developed often is referred to as a target system, and the system used for testing or debugging is often referred to as a host system.

There are many possible implementations for a communication port that is suitable for debugging and testing. The communication port may be a dedicated debugging and testing port. A dedicated port allows for complete testing of all target system components, except for the debugging port itself, but since the port is dedicated to debugging and testing, errors or malfunctions are unlikely to be detected by a consumer. A significant draw back to this approach, however, is the potential impact on the target system. Adding a dedicated port increases the cost of the target system by requiring additional components. Furthermore, design costs for the board may increase due to the additional components and signal lines or traces that must be laid out. In some circumstances, this may lead to a larger size than would otherwise be necessary, which may ripple throughout the target system-more power, larger enclosure, more cooling, etc.

To reduce costs, the components may be added only to a certain number of target systems that are used for testing and debugging. When the target system is produced, the components are omitted. Although some cost savings may be realized, omitting the components from production models introduces some new problems and continues to suffer from some old ones. For example, the real estates used by the components and signal lines in the testing and debugging systems may not be reclaimed in the production models because the components are simply omitted. Furthermore, having different production and testing models may be problematic because there is no testing of the system that consumers actually use. Moreover, when a defective target system is returned to the manufacturer, no testing may be performed to identify the cause of the problem until the omitted components are added to the system, which represents a fairly significant cost due to the specialized handling of a single system and a substantial loss of time.

Another option may be to run signal lines to the edge of a board where a connector may be attached. This solution also suffers from the problem of wasted space from having to route extra signal lines, and there is some cost associated with making the signals available at the edge of a board, either through a header or some other connector.

It is also possible to use an existing port for debugging and testing. While this approach may be appropriate for simple applications, it can be difficult to share a port. Typically, the shared port is not debugged because the shared port is the one communicating debugging and testing data, which prevents it from being monitored during normal operation. Another problem that this approach introduces is special software for using the shared port for debugging. As a result, software being debugged and tested is slightly different from the production software that will ultimately run on the target system. This introduces the possibility that latent bugs in the software will not be observed during testing and debugging, but will manifest themselves in the production software. Latent bugs of this sort can be extremely difficult to identify and correct.

Accordingly, methods, systems, and computer program products for multiplexing a communication port to provide an additional independent communication channel are desired.

BRIEF SUMMARY OF THE INVENTION

The present invention relates to using a target port to provide an additional independent communication channel, where the additional independent communication channel shares some portion of hardware otherwise associated with the target port. Typically, a target port device of some sort will be connected to the target port for communicating data. An out-of-band signal indicates that hardware associated with the target port is being used to provide the additional independent communication channel. This out-of-band signal helps prevent the target port device connected to the target port from interpreting data for the additional independent communication channel as data directed to the target port device. In other words, the communication through the additional independent communication channel does not interfere with the target port device.

A communication board with one or more communication ports may be coupled to the additional independent communication channel of the target port. The one or more communication ports may be used in communicating data from a target system to other devices or systems, such as a host system. When the communication board makes multiple communication ports available, a specific port is identified for communicating with the other devices or systems. In communicating with the target system, the communication board may emulate a particular type of communication port that is supported by the target port, such as an IDE port.

One possible type of host system is a development system for designing, testing, and debugging the target system. In this arrangement, the target system may be somewhat optimized or specialized for delivering specific functionality, and therefore offer relatively limited development resources when compared to the host system. Communicating debug data through the additional independent communication channel of the target port allows for efficient target system design, without sacrificing powerful development, debugging, and testing tools that may be better suited to the host system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by practicing the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for using a port to provide an additional independent communication channel such that the additional independent communication channel shares some portion of hardware otherwise associated with the port. The embodiments of the present invention may comprise one or more special purpose computers, one or more general purpose computers, and/or various computer hardware, as discussed in greater detail below.

Embodiments within the scope of the present invention also include computer-readable media for carrying or having computer-executable instructions or data structures stored thereon. Computer-executable instructions comprise, for example, instructions and data which cause a general purpose computer, special purpose computer, or any other processing device to perform a certain function or group of functions. Computer-readable media may be any available media that can be accessed by a general purpose computer, special purpose computer, or any other processing device. By way of example, and not limitation, such computer-readable media may comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose computer, special purpose computer, or any other processing device. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Figure 1:
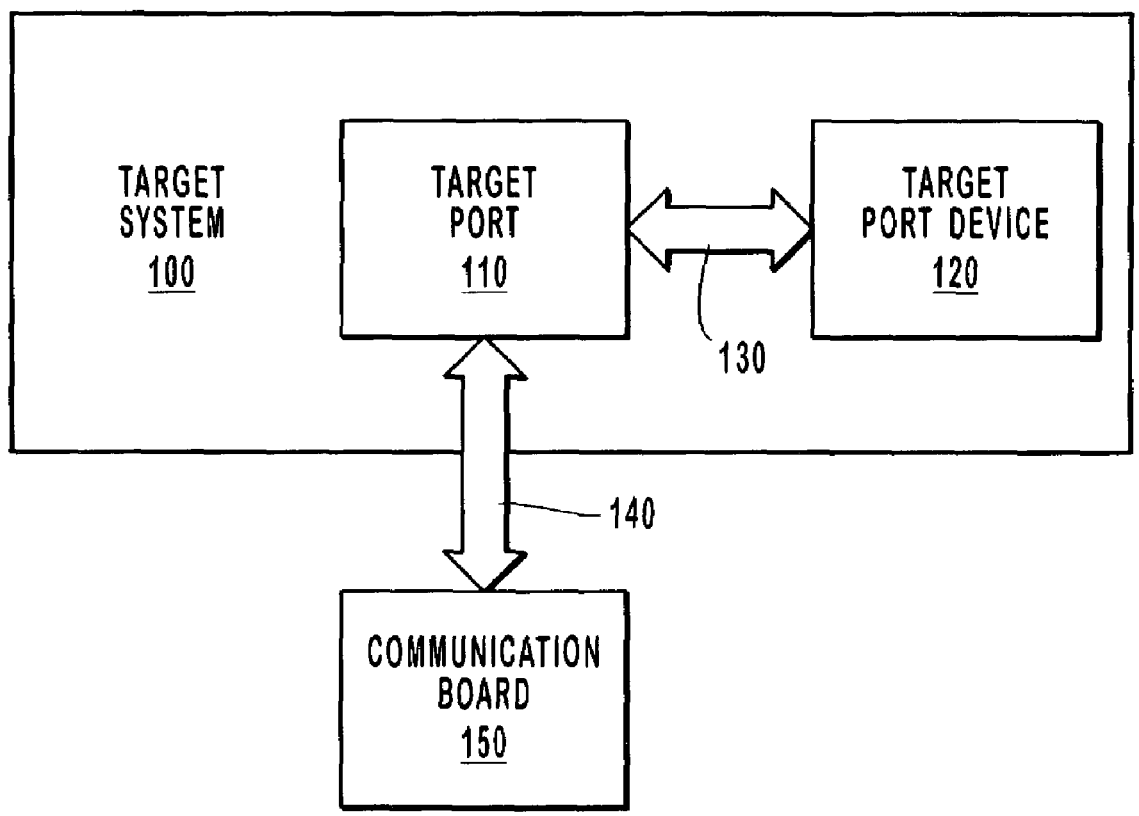
FIG. 1 illustrates a target system with a target port, and a communication board that operate in accordance with the present invention.

FIG. 1 illustrates a target system 100 with a target port 110 and a communication board 150 that operate in accordance with the present invention. Target port device 120 is connected to target port 110 through signals 130, and communication board 150 is coupled to target port 110 through signals 140. Note that the terms "connected" and "coupled" are generic terms related to data transfer and do not necessarily imply a physical connection, such as a cable or wire, but rather encompass any type of connection or coupling suitable for carrying data signals, including wireless connections or couplings. Similarly, the term "port" is a generic term for a data I/O communication point. Ports may include a combination of physical hardware, such as electronic logic, signal lines, controllers, processors, connectors, etc., and/or software for controlling the hardware.

In addition to the communication channel through signals 130 to target port device 120, target port 110 provides an additional independent communication channel through signals 140 to communication board 150. This additional independent communication channel shares at least some portion of the hardware, such as signal lines, electronic circuitry, etc., that is associated with target port 110. For example, some signal lines may be common to both signals 130 and signals 140. An out-of-band signal indicates when the additional independent communication channel is being used to communicate data. This out-of-band signal helps prevents the target port device 120 from interpreting data communicated through the additional independent communication channel as data directed to the target port device. Communication through the additional independent communication channel should not interfere with target port device 120.

Figure 2A:
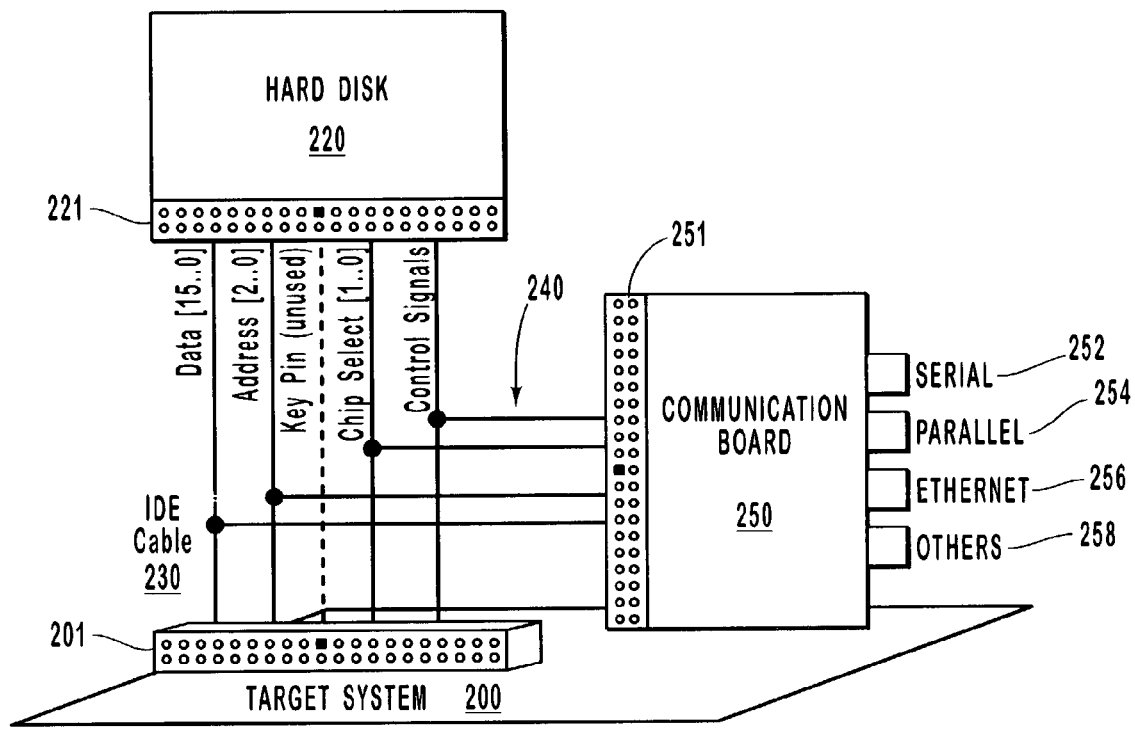
FIGS. 2a and 3a show example communication boards connected to an example target port.

FIG. 2a shows a communication board 250 connected to a target port of target system 200. The target port of target system 200 is an IDE port having an integrated device electronics ("IDE") connector 201 to which IDE cable 230 is attached. IDE cable 230 also is coupled to the connector 221 of an IDE interface for hard disk 220. As a result, a communication channel exists between hard disk 220 and target system 200. Note that hard disk 220 is merely one example of a target port device. Communication board 250 is coupled to the target port of target system 200 through connector 251, IDE cable 230, and connector 201, such that an additional independent communication channel 240 exists between communication board 250 and target system 200. Communication board 250 includes a variety of communication ports, such as serial port 252, parallel port 254, Ethernet port 256, other ports 258, etc., for communicating with other devices.

As indicated by connector 221, connector 251, and connector 201, an IDE interface includes 40 signal lines. Table I below identifies each standard signal line according to its assigned pin location on an IDE connector. Lines 3-18 carry data, lines 33, 35, and 36 carry addresses, lines 37 and 38 carry chip select signals, and various other lines carry control signals or are grounded. The chip selects indicate when IDE signals are intended for hard disk 220.

TABLE 1

IDE Connector Pinout

| Signal Name | Pin | Pin | Signal Name |
|---|---|---|---|
| Reset IDE | 1 | 2 | Ground |
| Data 7 | 3 | 4 | Data 8 |
| Data 6 | 5 | 6 | Data 9 |
| Data 5 | 7 | 8 | Data 10 |
| Data 4 | 9 | 10 | Data 11 |
| Data 3 | 11 | 12 | Data 12 |
| Data 2 | 13 | 14 | Data 13 |
| Data 1 | 15 | 16 | Data 14 |
| Data 0 | 17 | 18 | Data 15 |
| Ground | 19 | 20 | Key |
| DMAREQ | 21 | 22 | Ground |
| I/O Write | 23 | 24 | Ground |
| I/O Read | 25 | 26 | Ground |
| IOCHRDY | 27 | 28 | Cable Select |
| DMAACK | 29 | 30 | Ground |
| IRQ | 31 | 32 | Obsolete (IOCH16) |
| Addr 1 | 33 | 34 | PDIAG-/CBLID- |
| Addr 0 | 35 | 36 | Addr 2 |
| CS0- | 37 | 38 | CS1- |
| Activity | 39 | 40 | Ground |

Communication through an IDE interface is relatively limited in terms of the distances that signals may travel. Ordinarily, IDE interfaces carry data within a single computing device, perhaps most commonly, from the motherboard of a computing device to a hard disk or optical disc, such as a CD or DVD drive. Among other reasons, limiting the distance signals travel allows an IDE interface to operate at a faster speed than otherwise would be possible or practical if arbitrary distances could be covered.

In contrast, serial ports, parallel ports, network ports, and various other ports are designed for transmitting signals over significantly longer distances than an IDE port. These ports for communicating over longer distances usually are connected to a system bus or system interface. In most circumstances, therefore, connecting a communication board to an IDE interface is somewhat counterintuitive because the IDE port simply adds an unnecessary, and more likely undesirable, layer of communication overhead, without providing any significant benefit.

Nevertheless, communication board 250 is coupled to an IDE port of target system 200 to provide a number of communication options for use in testing and debugging target system 200. It should be noted that the term "debugging" as used in this application should be interpreted broadly to encompass any type of diagnostic operation or data, including testing and performance data. Target system 200 may include a serial port, a parallel port, a network port, and/or other ports for communicating with peripherals or other devices or systems during normal operation. However, for purposes of testing and debugging, it may be impractical and undesirable to test or debug a port that is in use. Among other things, testing and debugging a port while the port is in use may demand specialized debugging or testing software, including special device drivers, that is later eliminated when target system 200 goes into production. Eliminating the specialized debugging or testing software introduces the possibility of exposing latent software defects that were hidden by the specialized debugging or testing software. Accordingly, as a general rule, testing and debugging should be performed on a system that is identical, as least as nearly as possible, to the production system.

Figure 2B:
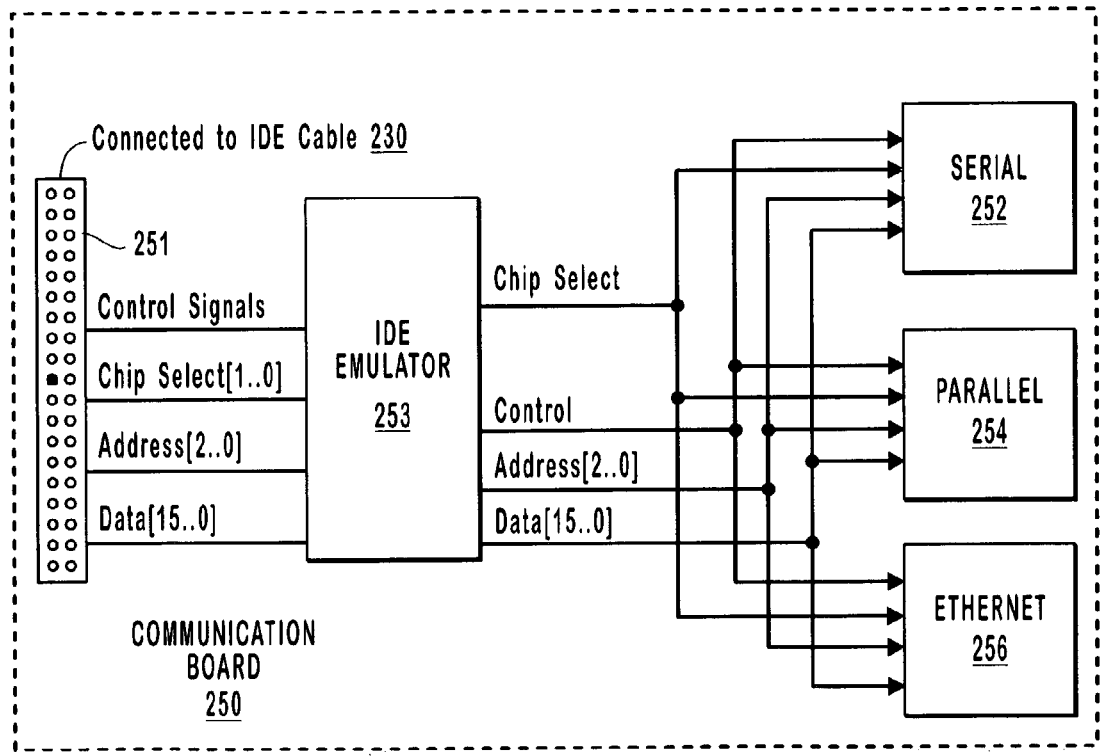
FIGS. 2b and 3b show additional detail for the example communication boards illustrated in FIGS. 2a and 3a, respectively.

Using the data, address, chip select, and control signal lines, target system 200 and hard disk 220 communicate data with each other over one communication channel. The target port of target system 200 also provides an out-of-band signal for indicating when an additional independent communication channel that shares at least some portion of the hardware otherwise dedicated to the target port is operating. As used in this application, the term "out-of-band signal" is a generic term for any signal indicating that communication is intended for an additional independent communication channel rather than for a communication channel between a target port and a target port device. In other words, an out-of-band signal is a signal that is outside of target port/target port device communication band. For the example target system 200 and communication board 250, the out-of-band signal is a chip select signal directing data to a second IDE device. This out-of-band signal indicates that communication through the target port is intended for communication board 250 rather than hard disk 220. For the embodiment shown in FIG. 2a, communication board 250 and hard disk 220 share virtually all of the target port's hardware FIG. 2b shows additional detail for communication board 250 of FIG. 2a. Connector 251 is coupled to IDE cable 230 and delivers the corresponding signals to IDE emulator 253. IDE emulator 253 implements sufficient IDE functionality so that target system 200 is able to communicate debug data to communication board 250. Additional IDE functionality may be implemented, up to full IDE compatibility, if desired. IDE emulator 253 directs certain signal lines to serial port 252, parallel port 254, and Ethernet port 256, as appropriate. Although not shown in FIG. 2b, communication board 250 may include other ports in addition to and/or in place of serial port 252, parallel port 254, and Ethernet port 256.

Those of ordinary skill in the art will recognize that sharing the target port hardware in target system 200 to provide an additional independent communication channel for communicating with communication board 250 has little impact on target system 200. No additional signal lines, logic, software, etc. are required to support the additional independent communication channel because nearly everything needed for the additional communication channel is already present for the communication channel between target system 200 and hard disk 220.

Although connecting communication board 250 to an IDE port represents a somewhat unusual design for providing serial, parallel, network, and other ports, the design offers significant benefits for testing and debugging, particularly in systems offering relatively modest development environments, such as embedded systems. As noted above, it is desirable to test all hardware and software that is part of a production system, including its various communication ports and drivers. While it is possible to add ports for the purpose of communicating debugging data, adding such specialized ports typically increases the cost of producing a system and offers little benefit to the end consumer, other than potentially improving the quality of the system. In contrast, use of the present invention, as embodied in FIGS. 2a and 2b, offers the testing, debugging, and performance monitoring benefits of a dedicated port, without imposing additional cost to the production system, either during development or in diagnosing systems returned due to a fault or failure of some sort.

Figure 3A:
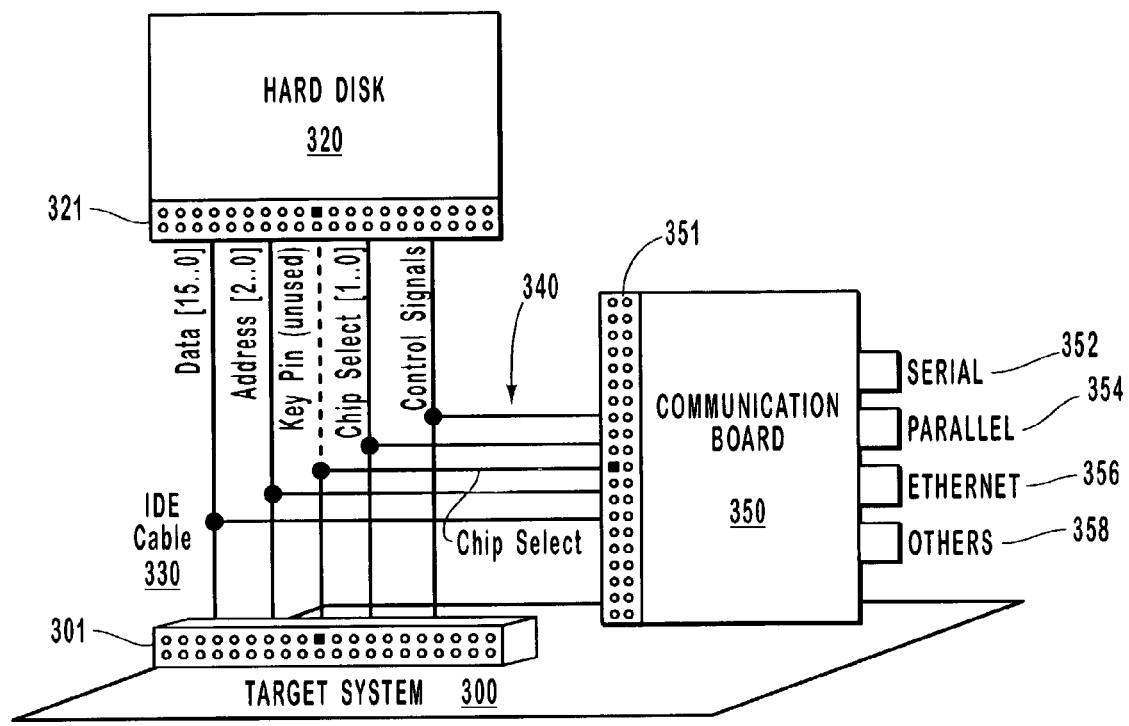

Similar to FIG. 2a, FIG. 3a shows a communication board 350 connected to an IDE target port of a target system 300. An IDE cable 330 is attached to the IDE connector 301 of the target port. At the other end, the IDE cable is attached to the IDE connector 321 of hard disk 320, completing a communication channel between hard disk 320 and target system 300. Communication board 350 also is coupled to the IDE target port of target system 300 through connector 351, IDE cable 330, and connector 301, such that an additional independent communication channel 340 exists between communication board 350 and target system 300. Here too, communication board 350 includes a serial port 352, a parallel port 354, an Ethernet port 356, other ports 358 to communicate with other devices or systems, such as a host system for debugging and testing.

IDE cable 330 carries nearly the same signals as IDE cable 230, including various data lines, address lines, chip select lines, and control signals. However, the key pin for IDE connector 301 of target system 300 is coupled to the key pin for IDE connector 351 of communication board 350. Note, however, the key pin is not connected to the key pin for the IDE connector 321 of hard disk 320. The key pin of an IDE connector is intended for orientation. Drives and controllers have male connectors with two rows of 20 pins each. The pins are surrounded by a plastic "fence" that extends to about the same height as the pins themselves. Cables have female connectors with two rows of 20 holes that correspond to the pins. The connectors are supposed to be keyed in two ways to assure that cables are not inserted upside-down. First, pin 20 of each male connector should be missing, and for each female cable connector, the corresponding hole for pin 20 should be blocked. Second, the top of the plastic fence surrounding the pins of each male connector should be notched in the middle, to match a tab included in the top middle portion of each female connector.

In practice, however, not all IDE connectors and cables include these keying features. Some manufactures have elected to forego keying in an effort to assure compatibility. A cable manufacturer may not include a connector tab or may not block pin 20 to assure compatibility with a drive that does not include a connector notch or one that includes pin 20, and vice versa. Although each pin is not labeled separately, note that one pin for connector 301, connector 321, and connector 351 is shown as a solid square to indicate the presence of a key pin. The solid square is intended only to show the approximate location of the pin in relation to other pins in an IDE connector, and has no other structural significance. Current, and all previous ATA specifications state that key pin 20 is electrically unused, i.e., not coupled to a signal line.

Key pin 20 carries an out-of-band signal that indicates when data is intended for communication board 350. Asserting this signal provides an independent communication channel between communication board 350 and target system 300 that shares a portion of the hardware dedicated to the target port. Note that "asserting" is a broad term that includes setting a signal to a particular logic level, such as a high logic level or a low logic level. The particular logic level used in a particular embodiment may vary depending on various design considerations for that particular embodiment. For the embodiment shown in FIG. 3a, hard disk 320 and communication board 350 share most of the target port's hardware. However, key pin 20 is exclusive to the communication channel between communication board 350 and the IDE port of target system 300.

When key pin 20 is asserted, the chip select for hard disk 320 is not asserted so that communication between target system 300 and communication board 350 does not interfere with hard disk 320. Various data exchanged between target system 300 and communication board 350 may be present at hard disk 320, i.e., may appear at the signal lines coupled to hard disk 320, but hard disk 320 does not necessarily act on them. In other words, hard disk 320 may receive or monitor the signals, but is able to determine that the data is not intended for hard disk 320. For example, in most circumstances, the chip selects that indicate data is intended for hard disk 320 should not be asserted while communicating with communication board 350 because hard disk 320 ordinarily does not have access to key pin 20 and therefore may not be able to determine that the data actually is intended for communication board 350.

As indicated above with respect to FIG. 2a, an IDE interface is relatively limited in terms of the distances that signals lines may travel. Accordingly, IDE interfaces ordinarily carry data within a single computing device. In contrast, serial ports, parallel ports, network ports (such as an Ethernet port), and various other ports are designed for transmitting signals over relatively longer distances than an IDE port. When supported, these ports for communicating over longer distances typically are connected to a system bus or system interface, rather than an IDE interface. In most circumstances, therefore, connecting a communication board to an IDE interface is somewhat counterintuitive because the IDE port simply adds an unnecessary, and more likely undesirable, layer of communication overhead, without providing any significant benefit.

Nevertheless, communication board 350 is coupled to an IDE port of target system 300 to provide additional communication options for a variety of purposes, such as for debugging target system 300. While target system 300 may include a serial port, a parallel port, a network port, and/or other ports for communicating with peripherals, other devices, or other systems during normal operation, it often proves difficult and may be undesirable to communicate debugging data through a port that is in use. For example, testing and debugging a port while the port is otherwise in use may demand specialized debugging or testing software, including special device drivers, that is later eliminated when target system 200 goes into production. Because altering software or hardware introduces the possibility of exposing latent defects, testing and debugging should be performed on a system that is identical to the production system, if possible.

Figure 3B:
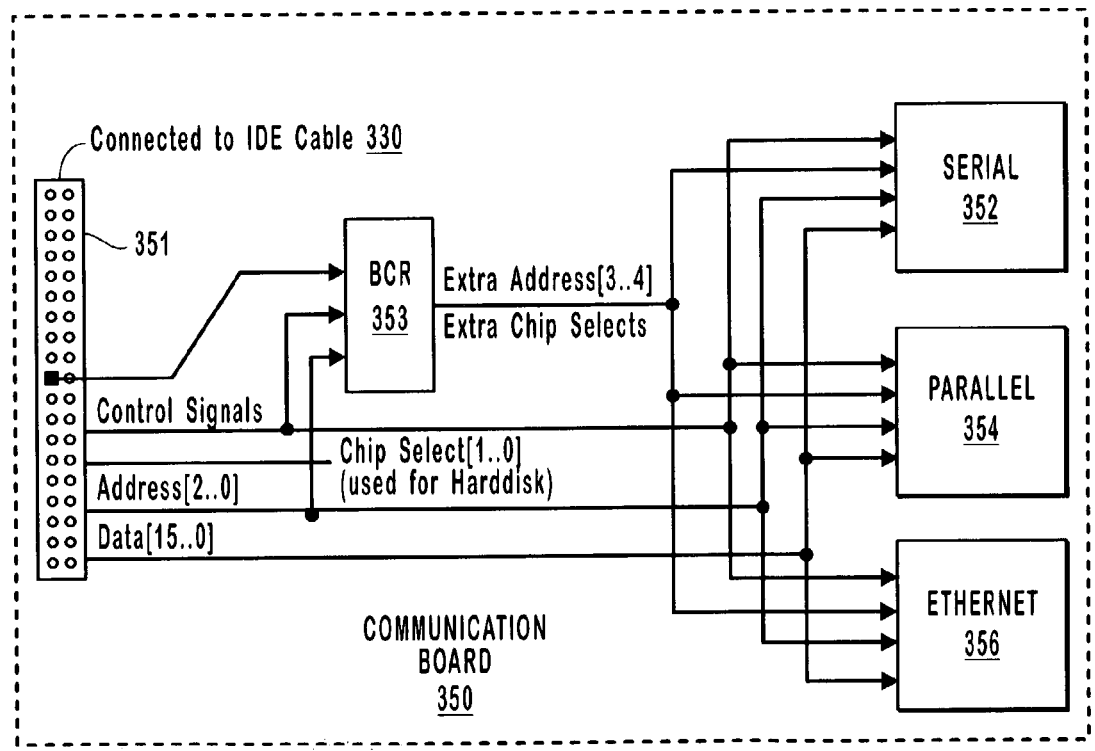

FIG. 3b shows additional detail for communication board 350 of FIG. 3a. Connector 351 is coupled to IDE cable 330 and connects the corresponding signals to the appropriate components of communication board 350. Data, address, and control signals are connected to the ports that communication board 350 supports, such as serial port 352, parallel port 354, Ethernet port 356, etc. Note that in this embodiment, the chip select signals are used only in communicating with hard disk 320 and are not connected beyond connector 351. The control and address signals also are connected to a bank control register ("BCR") 353, as is key pin 20.

BCR 353 generates extra address lines and chip selects due to the limited number of address lines that are available to communication board 350. Typically, each communication port has some address space, and the eight different address combinations possible with three address lines is insufficient to support the address space of each port and distinguish between the ports themselves. BCR 353 stores an offset address sent in one cycle that may be added to subsequent addresses of later bus cycles to increase the available address space and generate the chip selects corresponding to the available address space. As a result, communication board 350 is able to support a wide range of communication ports and is not as limited in the number that may be present at any given time. Although not shown in FIG. 3b, communication board 350 may include other ports in addition to and/or in place of serial port 352, parallel port 354, and Ethernet port 356, including added network ports.

Similar to the communication board shown in FIGS. 2a and 2b, those of ordinary skill in the art will recognize that sharing the target port hardware in target system 300 to provide an additional independent communication channel for communicating with communication board 350 has minimal impact on target system 300. Only one additional signal line, key pin 20, is required to support the additional independent communication channel because nearly everything needed for the additional communication channel is already present for the communication channel between target system 300 and hard disk 320.

Therefore, although connecting communication board 350 to an IDE port represents an a typical model for adding serial, parallel, network, and other ports, the design offers significant benefits, particularly for testing and debugging systems without a robust development environment, such as embedded systems. For example, while it is possible to add dedicated hardware and/or software for debugging, such additions tend to increase the cost of producing a system without offering much of a benefit to the end consumer. Use of the present invention, in contrast, as embodied in FIGS. 3a and 3b, offers the benefits of a dedicated port for testing, debugging, and performance monitoring, without imposing significant additional cost to the production system.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 4:
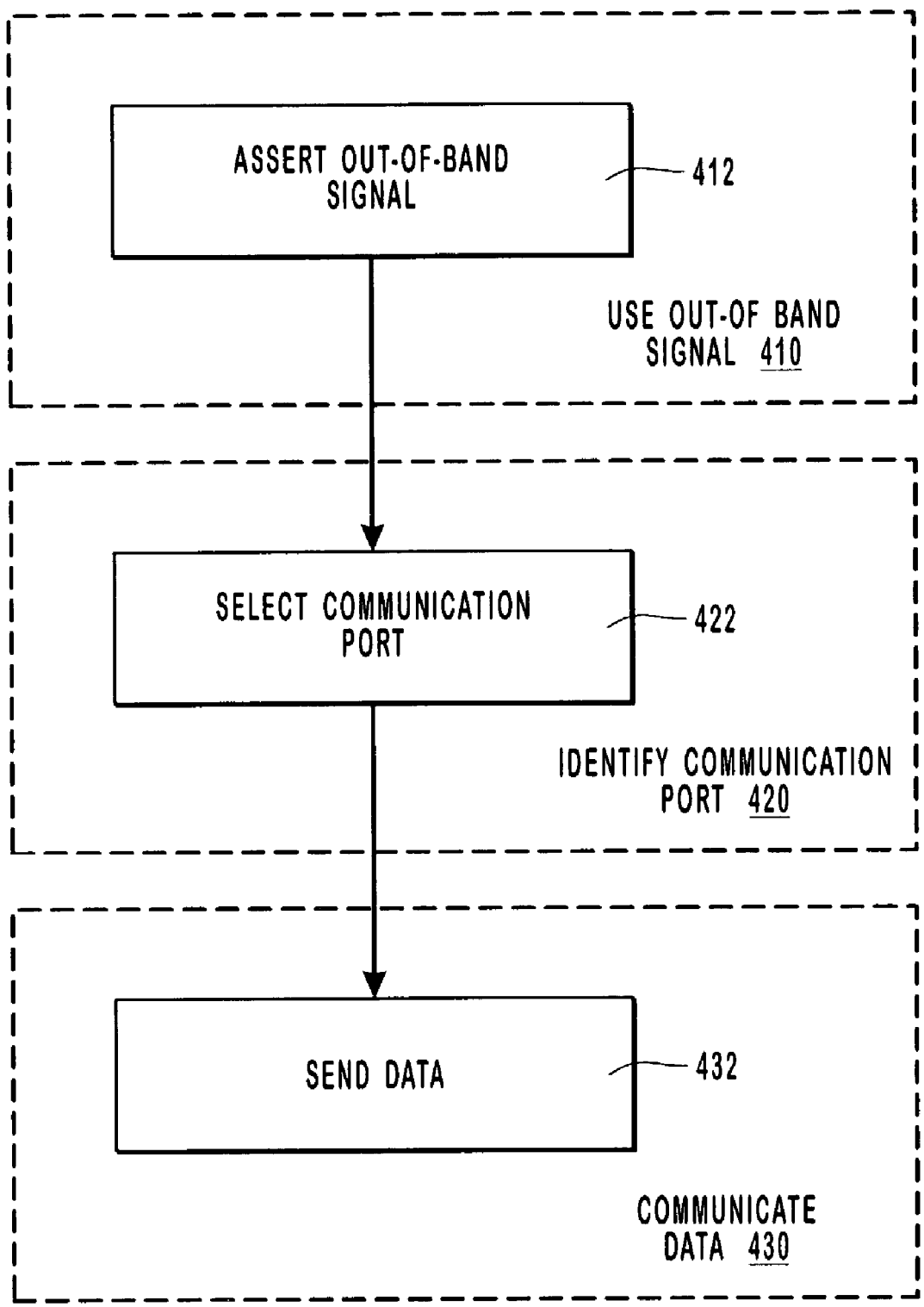
FIGS. 4 and 5 are flow diagrams showing example acts and steps for methods according to the present invention.

FIG. 4 is a flow diagram showing example acts and steps for methods performed at a target port embodiment in accordance with the present invention. A step for using (410) an out-of-band signal to indicate that at least a portion of hardware otherwise associated with a target port is being used to provide an additional independent communication channel may include an act of asserting (412) the out of band signal such that at least a portion of hardware otherwise dedicated to the target port provides an additional independent communication channel. For example, an electrically unused pin, such as pin 20 of an IDE connector may be asserted.

A step for identifying (420) one of one or more communication ports of a communication board for communicating data to a host system, such as a general purpose computer for debugging the target system, may include an act of selecting (422) one of the communication ports for connecting to the host system. A step for interacting (not shown) with the communication board as if the communication board were an IDE compatible device may include an act of emulating (not shown) an IDE compatible device. A step for communicating (430) data through the additional independent communication channel without interfering with a target port device may include an act of sending (432) data through the additional independent communication channel.

Figure 5:
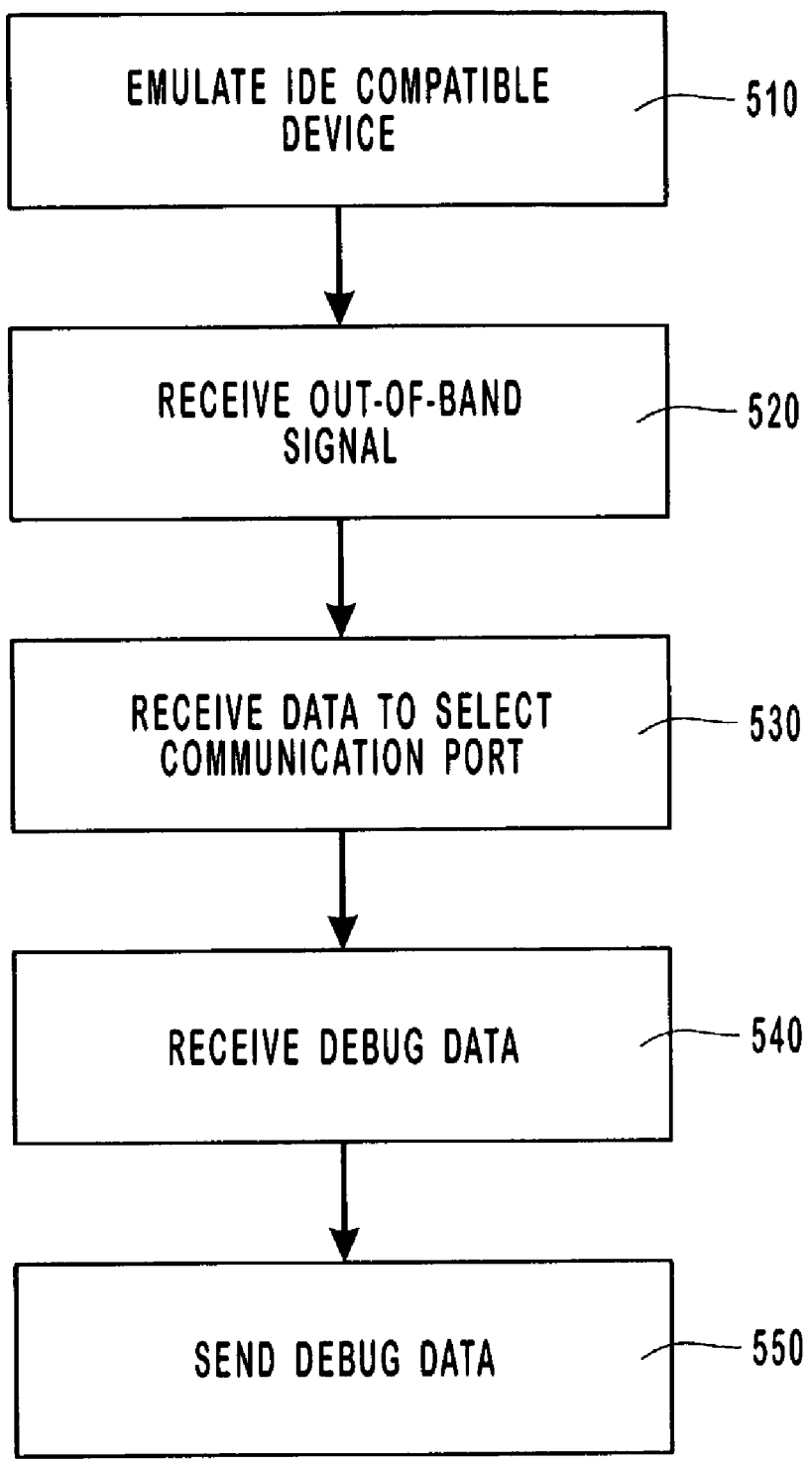

FIG. 5 is a flow diagram showing example acts for methods performed at a communication board embodiment in accordance with the present invention. A method for a communication board interacting with a target port through an additional independent communication channel that shares at least some hardware with the target port may include acts of: emulating (510) an IDE compatible device so that debug data is received as if the communication board were an IDE compatible device; receiving (520) an out-of-band signal, such as an IDE chip select, indicating that the at least some hardware otherwise dedicated to the target port is being used to provide the additional independent communication channel; receiving (530) data that selects one of one or more communication ports provided by the communication board for connecting to a host system; receiving (540) debug data through the additional independent communication channel; and sending (550) the debug data to a host system for debugging.

Figure 6:
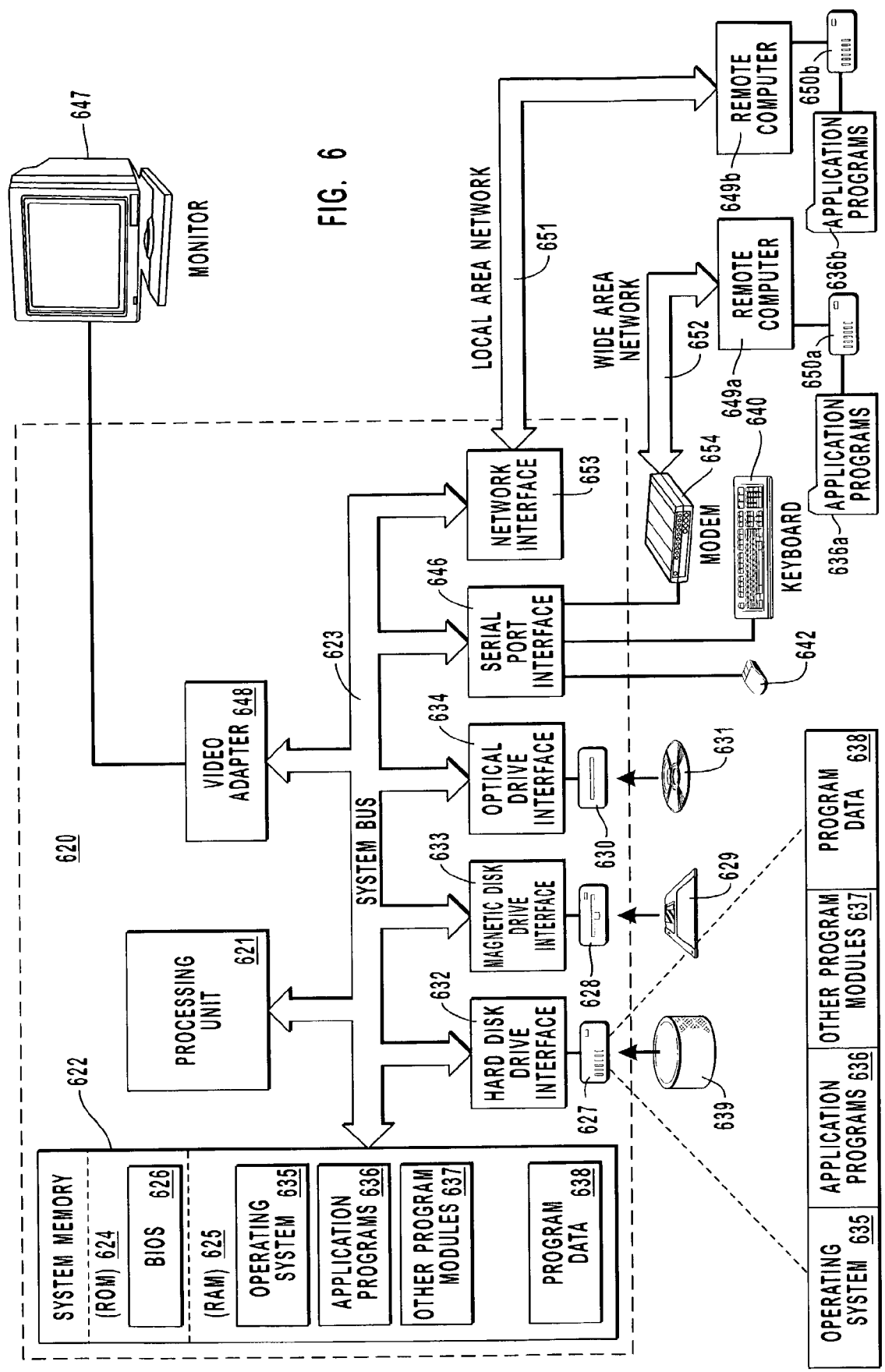
FIG. 6 illustrates an example host system for communicating with a target system, such as the example target system illustrated in FIG. 7.

FIG. 6 illustrates an example host system for communicating with a target system, such as the example target system illustrated below in FIG. 7. As used in this application the terms "host" and "target" are used to describe the relationship between two systems and do not necessarily provide an indication of the specific or relative hardware configurations that may be present in each system. Accordingly, FIG. 6 and the following discussion are intended to provide a brief, general description of a suitable computing environment for a host system. Many other computing environments for a host system are possible.

Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, television set-top boxes, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference then to FIG. 6, the example host system includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 also may include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a wireless remote control, microphone, joy stick, game pad, antenna, satellite dish, scanner, or the like. These and other input devices are often connected to the processing unit 621 through a serial port interface 646 coupled to system bus 623. Alternatively, the input devices may be connected by other interfaces, such as a parallel port, a game port, a universal serial bus (USB), etc. A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

Figure 7:
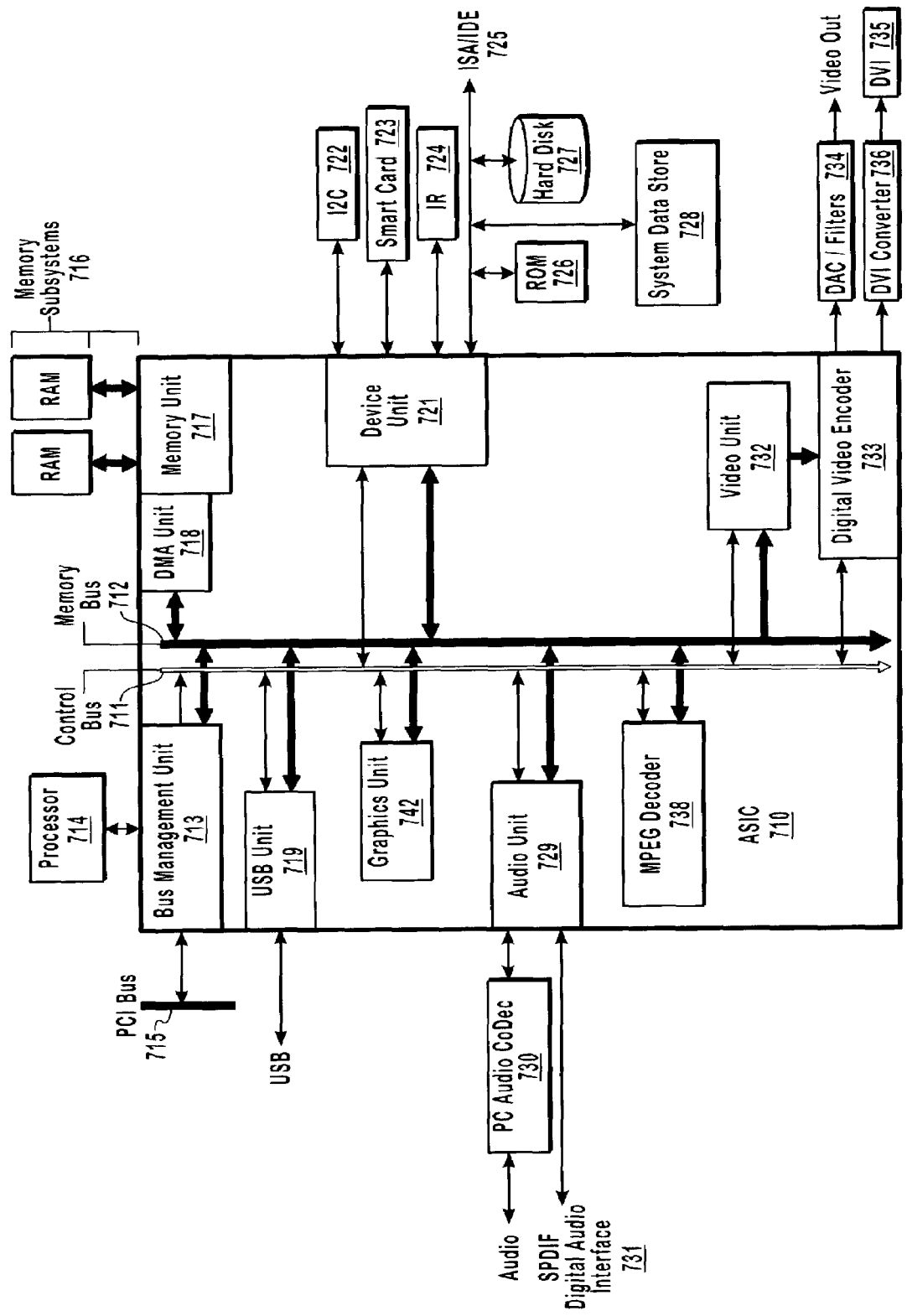
FIGS. 7 illustrates an example target system that provides one suitable environment for practicing the present invention.

FIG. 7 and the following discussion are intended to provide a brief, general description of a suitable computing environment for a target system-many other computing environments for a host system are possible. More specifically, FIG. 7 illustrates an application specific integrated circuit ("ASIC") 710 for an embedded system, such as a digital content receiver. ASIC 710 may receive content from any of a variety of sources, including broadcast systems, cable systems, satellite systems, and the Internet. It should be clear, however, that the present invention is not necessarily limited to any particular environment. For example, ASIC 710 may be incorporated into any type of consumer electronics device, including game consoles, tuners, set-top boxes, recorders, personal computers, handheld computing devices, and the like, for processing digital video, digital audio, executable software, scripts, marked up text and data, email, etc.

ASIC 710 includes a number of components that communicate over a control bus 711 and a memory bus 712. The control bus 711 carries relatively low bandwidth control information that controls the operation of each of the components of the ASIC 710. The memory bus 712 carries higher bandwidth information such as video information between each of the components of the ASIC 710 and memory. A bus management unit 713 manages the communication over the control bus 711 and also interfaces with a processor 714 and a PCI bus 715.

The processor 714 oversees the general video processing by dispatching instructions over the control bus 711 instructing the various components of the ASIC 710 to perform their specialized tasks. The processor 714 also monitors the progress of such tasks, thus controlling the various components of ASIC 710 in a coordinated fashion. The processor 714 may be any processor capable of performing such oversight functions including a MIPS or X86 architecture processor.

Typically, memory is required to perform such coordinated operations. Accordingly, the ASIC 710 has access to one or more memory subsystems 716 which provide volatile memory that is shared between the components of the ASIC 710. The memory subsystems 716 may be any memory subsystem that allows for rapid access to stored information. For example, the memory subsystems 716 may be DDR or SDRAM.

A memory unit 717 communicates directly with the memory subsystems 716. The memory unit 717 is more efficient if there are large, less frequent, and less regular accesses to the memory subsystems 716. However, many of the components of the ASIC 710 may operate most efficiently when there are smaller, but more frequent, and more regular memory transactions. The direct memory access ("DMA") unit 718 acts as a buffering interface such that the components may have small, frequent, and regular transactions with the DMA unit 718, while leaving it up to the DMA unit 718 to bundle the smaller transactions into larger, less frequent, and less regular transactions for the memory unit 717 to conduct with the memory subsystems 716. In this manner, when a component needs to access the memory subsystems 716, the component either communicates directly with the memory unit 717 or communicates through the DMA unit 718 depending on the nature of the transaction.

A universal serial bus ("USB") interface 719 is capable of running a universal serial bus. The USB unit 719 may be any conventional USB interface that is capable of interfacing with the control bus 711 and the memory bus 712.

A device unit 721 includes interfaces for a number of miscellaneous devices. For example, the device unit 721 contains a bi-directional interface for an 12C bus 722 for communication with external components, a bi-directional interface for a smart card 723, a bi directional infra red ("IR") serial interface 724, and a bi-directional ISA/IDE bus 725 that interfaces with a read only memory 726, a hard disk drive 727, and a system data store 728, as well as a number of other devices such as a DVD-ROM drive. Note that ISA/IDE bus 725 may be a single combined bus or two separate buses. As separate buses, the IDE bus typically provides access to hard disks and optical discs and the ISA bus typically provides access to ROM and the system data store. As described above, portions of the interface for hard disk drive 727 may be used to provide an additional independent communication channel for communicating data with a host system through a communication board. Other ports, which may or may not be shown in FIG. 7, also may be used to provide the additional independent communication channel.

A graphics unit 742 comprises a 3-D graphic rendering engine that may be, for example, an eight million polygon DirectX7 compatible 3-D graphics unit.

An audio unit 729 drives a PC audio interface 730 such as an AC'97 audio interface that may receive or transmit audio. The audio unit 729 may also drive other audio interface including a digital interface such as SPDIF digital audio interface 731.

A video unit 732 receives video data from the memory bus 712 and converts the video data into a digital display. The video unit 732 handles multiple windows of video data and may operate in RGB, YUV, or other color formats as needed. The video unit 732 provides the digital display data to the digital video encoder 733 which converts the digital display data into the desired format (e.g., NTSC or HDTV) and provides the digital video through a digital to analog converter ("DAC") and filter 734 to a composite, S-Video or component output. The digital video encoder 733 also may output the video to a digital video interface ("DVI") 735 using a DVI converter 736.

An MPEG decoder 738 is provided to decode MPEG streams. The MPEG decoder also performs subsample decoding by reducing the frame size of the resulting decoded frame.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a target system comprising a target port that provides a communication channel to a target port device connected to the target port, a method of multiplexing the target port to provide an additional independent communication channel, wherein the additional independent communication channel shares at least a portion of hardware otherwise dedicated to the target port, the method comprising:

asserting an out-of-band signal to indicate that at least a portion of hardware otherwise dedicated to a target port is being used for communicating data, wherein, while asserting the out-of-band signal, at least a portion of hardware otherwise dedicated to the target port is multiplexed to provide an additional independent communication channel, and wherein the target port comprises an Integrated Device Electronics ("IDE") port; and sending data through the additional independent communication channel in a manner such that if received by the target port device, the target port device determines that the data is intended for another device.

2. A method as recited in claim 1, wherein the data sent through the additional independent communication channel comprises debugging data.

3. A method as recited in claim 1, wherein a communication board is connected to the additional independent communication channel.

4. A method as recited in claim 3, wherein the communication board comprises one or more communication ports for connecting to a host system, the method further comprising an act of selecting one of the one or more communication ports, whereby data sent through the additional independent communication channel is sent to the host system through the selected communication port.

5. A method as recited in claim 4, wherein the communication board comprises a bank control register for selecting the one of the one or more communication ports by generating at least one of (i) one or more extra address lines, or (ii) one or more extra chip select lines; and wherein the data sent through the additional independent communication channel comprises data directed to the bank control register.

6. A method as recited in claim 4, wherein the host system comprises a general purpose computer for debugging the target system.

7. A method as recited in claim 4, wherein at least one of the one or more communication ports comprises
(i) a serial port,
(ii) a parallel port, or
(iii) a network port.

8. A method as recited in claim 1, wherein the target port comprises an IDE connector, and wherein asserting the out-of-band signal comprises asserting a signal carried over pin 20 of the IDE connector.

9. A method as recited in claim 1, wherein the target port is capable of communicating with at least two IDE compatible devices, one of which is the target port device, and wherein a communication board which emulates an IDE compatible device is connected to the additional independent communication channel, and wherein data is sent through the additional independent communication channel as if the communication board were a second IDE compatible device.

10. A method as recited in claim 9, wherein the target port device comprises a first hard disk, and wherein the communication board emulates a second hard disk.

11. A method as recited in claim 9, wherein the communication board comprises one or more communication ports for connecting to a host system, the method further comprising an act of selecting one of the communication ports for connecting to the host system.

12. A method as recited in claim 1, wherein the target port operates in accordance with the IDE standard, and wherein asserting the out-of-band signal comprises asserting a signal carried over a pin that the IDE standard identifies as electrically unused.

13. For a target system comprising a target port that provides communication channel to a target port device connected to the target port, a computer program product comprising a computer readable medium carrying computer executable instructions that implement a method of multiplexing the target port to provide an additional independent communication channel, wherein the additional independent communication channel shares at least a portion of hardware otherwise dedicated to the target port, the method comprising acts of:

asserting an out-of-band signal to indicate that at least a portion of hardware otherwise dedicated to a target port is being used for communicating data, wherein, while asserting the out-of-band signal at least a portion of hardware otherwise dedicated to the target port is multiplexed to provide an additional independent communication channel, and wherein the target port comprises an Integrated Device Electronics ("IDE") port; and sending data through the additional independent communication channel in a manner such that if received by the target port device, the target port device determines that the data is intended for another device.

14. A computer program product as recited in claim 13, wherein the data sent through the additional independent communication channel comprises debugging data.

15. A computer program product as recited in claim 13, wherein communication board comprising one or more communication ports, for connecting to a host system, is connected to the additional independent communication channel, the method further comprising an act of selecting one of the one or more communication ports, whereby data sent through the additional independent communication channel is sent to the host system through the selected communication port.

16. A computer program product as recited in claim 15, wherein the communication board comprises a bank control register for selecting the one of the one or more communication ports by generating, in addition to those already available, at least one of
(i) one or more extra address lines, or
(ii) one or more extra chip select lines, and wherein the data sent through the additional independent communication channel comprises data directed to the bank control register.

17. A computer program product as recited in claim 13, wherein asserting the out-of-band signal comprises asserting a signal carried over pin 20 of the IDE connector.

18. A computer program product as recited in claim 13, wherein the target port is capable of communicating with at least two IDE compatible devices, one of which is the target port device, and wherein a communication board which emulates an IDE compatible device is connected to the additional independent communication channel, and wherein data is sent through the additional independent communication channel as if the communication board were a second IDE compatible device.

19. In a target system comprising a target port that provides a communication channel to a target port device coupled to the target port, a method of operating the target port to provide an additional independent communication channel, wherein the additional independent communication channel shares at least a portion of hardware otherwise associated with the target port, the method comprising:

a step for using an out-of-band signal to indicate that at least a portion of hardware otherwise associated with a target port is being used to provide an additional independent communication channel for communicating data; and a step for communicating data through the additional independent communication channel without interfering with the target port device and in a manner such that if the data is received by the target port device, the target port device determines that the data is intended for another device;

wherein the target port comprises an Integrated Device Electronics ("IDE") port.

20. A method as recited in claim 19, wherein the target port comprises an IDE connector, and wherein the step for using the out-of-band signal comprises an act of asserting a signal carried over pin 20 of the IDE connector.

21. A method as recited in claim 19, wherein the target port is capable of interfacing with at least two IDE compatible devices, one of which is the target port device, and wherein a communication board which emulates an IDE compatible device is coupled to the additional independent communication channel, the method further comprising a step for interacting with the communication board as if the communication board were a second IDE compatible device.

22. A method as recited in claim 21, wherein the communication board comprises one or more communication ports for communicating with a host system, the method further comprising an act of selecting one of the communication ports for connecting to the host system.

23. For a target system comprising a target port that provides a communication channel to a target port device coupled to the target port, a computer program product comprising a computer readable medium carrying computer executable instructions that implement a method of operating the target port to provide an additional independent communication channel, wherein the additional independent communication channel shares at least a portion of hardware otherwise associated with the target port, the method comprising steps for:

using an out-of-band signal to indicate that at least a portion of hardware otherwise associated with a target port is being used to provide an additional independent communication channel for communicating data; and communicating data through the additional independent communication channel without interfering with the target port device, and in a manner such that if the data is received by the target port device, the target port device determines that the data is intended for another device;

wherein the target port comprises an Integrated Device Electronics ("IDE") port and an IDE connector.

24. A computer program product as recited in claim 23, wherein the step for using the out-of-band signal comprises an act of asserting a signal carried over pin 20 of the IDE connector.

25. A computer program product as recited in claim 23, wherein the target port is capable of interfacing with at least two IDE compatible devices, one of which is the target port device, and wherein a communication board which emulates an IDE compatible device is coupled to the additional independent communication channel, the method further comprising a step for interacting with the communication board as if the communication board were a second IDE compatible device.

26. In a communication board comprising one or more communication ports for connecting to a host system and at least one port for connecting to a target port of a target system, wherein the target port provides a communication channel to a target port device that is connected to the target port, a method of interacting with the target port through an additional independent communication channel that shares at least some hardware with the target port the method comprising acts of:

receiving an out-of-band signal indicating that at least some hardware otherwise dedicated to a target port is being used to provide an additional independent communication channel for communicating debug data; and receiving the debug data through the additional independent communication channel, wherein the received debug data is communicated in a manner such that if the data were received by the hardware otherwise dedicated to the target port, such hardware can determine that the data is intended for another device; and sending the debug data to a host system;

wherein the host system comprises a general purpose computer, and wherein the target port comprises an Integrated Device Electronics ("IDE") port.

27. A method as recited in claim 26, wherein the target port comprises an IDE connector, and wherein the out-of-band signal is received through pin 20 of the IDE connector.

28. A method as recited in claim 26, wherein the target port is capable of communicating with at least two IDE compatible devices, one of which is the target port device, the method further comprising an act of the at least one port for connecting to a target port emulating an IDE compatible device so that the debug data is received as if the communication board were a second IDE compatible device.

29. A multiplexing target port capable of providing multiple communication channels with electronic circuitry that is common to the multiple communication channels, the multiplexing target port comprising:

electronic circuitry, dedicated to the target port, that provides a communication channel with a target port device, wherein the electronic circuitry is configured to carry communications to the target port device in a manner that allows the target port device to determine that the data is intended for another device;

a connector coupled to the target port device and the electronic circuitry that is dedicated to the target port; and one or more out-of-band signal lines, coupled to the connector, indicating when at least some of the electronic circuitry dedicated to the target port is being shared with an additional independent communication channel;

wherein the target port comprises an Integrated Device Electronics ("IDE") port, and wherein the connector comprises an IDE connector.

30. A target port as recited in claim 29, wherein the one or more out-of-band signal lines comprise a signal line carried over pin 20 of the IDE connector.

31. A target port as recited in claim 29, wherein the target port is coupled to a communication board that emulates an IDE compatible device, and wherein the communication board comprises one or more communication ports for connecting to a host system.

32. A target port as recited in claim 31, wherein the target port is capable of communicating with at least two IDE compatible devices, one of which is the target port device, and another of which is the communication board, and wherein the one or more out-of-band signal lines comprise device enable lines for the at least two IDE compatible devices.

* * * * *